US008321086B2

(12) United States Patent
Park et al.

(10) Patent No.: US 8,321,086 B2
(45) Date of Patent: Nov. 27, 2012

(54) GATEWAY CONTROL APPARATUS FOR VEHICLES AND TRAVEL INFORMATION RECORDING METHOD THEREOF

(75) Inventors: Min Woo Park, Seongnam-si (KR); Doo Kyum Kim, Seoul (KR)

(73) Assignee: Mando Corporation, Gyeonggi-Do (KR)

( * ) Notice: Subject to any disclaimer, the term of this patent is extended or adjusted under 35 U.S.C. 154(b) by 559 days.

(21) Appl. No.: 12/490,155

(22) Filed: Jun. 23, 2009

(65) Prior Publication Data

US 2009/0319119 A1 Dec. 24, 2009

(30) Foreign Application Priority Data

Jun. 23, 2008 (KR) ........................ 10-2008-0058918

(51) Int. Cl.
*G01M 17/00* (2006.01)

(52) U.S. Cl. ....................................... 701/34.3; 713/193

(58) Field of Classification Search .................... 701/33, 701/35, 36, 34.3, 34.4, 43, 29.1, 29.2, 29.6, 701/29.9, 31.4, 31.5, 31.7–31.9, 32.2, 32.3; 340/438; 713/193

See application file for complete search history.

(56) References Cited

U.S. PATENT DOCUMENTS

| | | | | |
|---|---|---|---|---|
| 6,463,373 | B2 * | 10/2002 | Suganuma et al. | 701/48 |
| 6,573,831 | B2 * | 6/2003 | Ikeda et al. | 340/505 |
| 7,348,895 | B2 * | 3/2008 | Lagassey | 340/907 |
| 7,706,940 | B2 * | 4/2010 | Itatsu | 701/35 |
| 2003/0225492 | A1 | 12/2003 | Cope et al. | |
| 2008/0255721 | A1 * | 10/2008 | Yamada | 701/33 |

OTHER PUBLICATIONS

U.S. Appl. No. 12/509,221, Seung Hyun Roh et al., "Method and Apparatus for Gathering Vehicle Accident Information," filed Jul. 24, 2009.

* cited by examiner

*Primary Examiner* — Dalena Tran

(74) *Attorney, Agent, or Firm* — McDermott Will & Emery LLP

(57) ABSTRACT

A gateway control apparatus for vehicles includes a receiver receiving travel state information sent from sensors and vehicle ECUs through interfaces, a first memory storing the travel state information, a determination unit determining occurrence of a vehicle accident or an ECU malfunction based on the travel state information, a second memory, and a controller allowing the second memory to store malfunction information of an associated ECU among the travel state information if the ECU malfunction has occurred, and allowing the first memory to store pre-accident travel state information and post-accident vehicle state information with reference to an accident occurrence time point if the vehicle accident has occurred. The gateway control apparatus enables not only data communication between the ECUs having different communication modes, but also accurate analysis of causes of the vehicle accident or the ECU malfunction. A travel information recording method of the gateway control apparatus is also disclosed.

8 Claims, 4 Drawing Sheets

GATEWAY CONTROL APPARATUS FOR VEHICLES AND TRAVEL INFORMATION RECORDING METHOD THEREOF

BACKGROUND

1. Technical Field

The present disclosure relates to a gateway control apparatus for vehicles and a travel information recording method thereof. More particularly, the present disclosure relates to a gateway control apparatus for vehicles and a travel information recording method thereof, which can record, based on travel state information of a vehicle received via communication, malfunction information of electronic control units (ECUs) before and after occurrence of an ECU malfunction, or pre-accident travel state information and post-accident vehicle state information upon occurrence of a vehicle accident, thereby preventing recurrence of the same or similar type of ECU malfunction or vehicle accident through analysis of causes of the ECU malfunction or vehicle accident.

2. Description of the Related Art

Generally, gateways enable data communication between ECUs having different communication modes, such as a controller area network (CAN), a local interconnect network (LIN), a media oriented systems transport (MOST), and a FlexRay, and have a simple function of recording communication data.

As such, the gateways can only record the communication data, but cannot provide and analyze vehicle travel state information. Accordingly, when any ECU of a vehicle malfunctions, a rapid treatment or review of the malfunction of the ECU is not performed, thereby making it difficult to prevent or avoid a vehicle accident or to analyze causes of the malfunction.

Furthermore, even when there is a vehicle accident, the gateways cannot analyze or examine the causes of the accident, so that a user cannot take a rapid action against the accident or malfunction.

BRIEF SUMMARY

The present disclosure is directed to solving the problems of the related art as described above, and embodiments include a gateway control apparatus for vehicles and a travel information recording method thereof, which can record, based on travel state information received via communication, ECU malfunction information before and after occurrence of an ECU malfunction or pre-accident travel state information and post-accident vehicle state information when a vehicle accident occurs, thereby preventing recurrence of the same or similar type of ECU malfunction or vehicle accident through analysis of causes of the ECU malfunction or vehicle accident. Therefore, the embodiments of the disclosure enable a user to quickly cope with any vehicle accident or ECU malfunction.

In accordance with one aspect, a gateway control apparatus for vehicles includes: a receiver receiving travel state information sent from sensors and ECUs of a vehicle through interfaces; a first memory storing the received travel state information; a determination unit determining occurrence of a vehicle accident or an ECU malfunction based on the stored travel state information; a second memory; and a controller allowing the second memory to store malfunction information of an associated ECU among the travel state information stored in the first memory, if the determination unit determines based on the travel state information that the ECU malfunction has occurred, and allowing the first memory to store pre-accident travel state information and post-accident vehicle state information with reference to an accident occurrence time point, if the determination unit determines based on the travel state information that the vehicle accident has occurred.

The malfunction information of the ECU stored in the second memory may include identification information of the ECU, occurrence time information of the ECU malfunction, type information of the ECU malfunction, and vehicle (travel?) state information before and after occurrence of the ECU malfunction. The controller may send the malfunction information of the ECU stored in the second memory to telematics. The controller may allow the first memory to store the pre-accident travel state information and the post-accident vehicle state information, and to stop storing the post-accident vehicle state information when a predetermined period of time elapses after the vehicle accident.

Each piece of the travel state information stored in the first memory may include a time stamp, which may be calculated by a timer or corrected with reference to satellite time received through a GPS receiver.

Meanwhile, if it is determined that the ECU malfunction has occurred, the controller may allow the second memory to store state information of the associated ECU before and after occurrence of the ECU malfunction with reference to a malfunction occurrence time point based on the time stamp.

Furthermore, the first memory may have at least one storage space allocated for each of the interfaces to store the received travel state information in the storage space according to time sequence.

In accordance with another aspect, a travel information recording method of a gateway control apparatus for vehicles includes: storing travel state information received from sensors and ECUs of a vehicle in a first memory; determining based on the stored travel state information whether there is a vehicle accident or an ECU malfunction; storing ECU malfunction information in a second memory among the travel state information stored in the first memory, if it is determined that the ECU malfunction has occurred; and storing pre-accident travel state information and post-accident vehicle state information in the first memory with reference to an accident occurrence time point, if it is determined that the vehicle accident has occurred.

The storing pre-accident travel state information and post-accident vehicle state information in the first memory may include performing a time count; determining whether counted time exceeds a preset time; receiving and storing the post-accident vehicle state information in the first memory, if the counted time does not exceed the preset time; and stopping the step of storing the post-accident vehicle state information in the first memory, if the counted time exceeds the preset time.

The travel information recording method may further include sending the ECU malfunction information stored in the second memory to telematics after storing the ECU malfunction information in the second memory.

DETAILED DESCRIPTION

Hereinafter, exemplary embodiments of the present disclosure will be described in detail with reference to the accompanying drawings.

Figure 1:
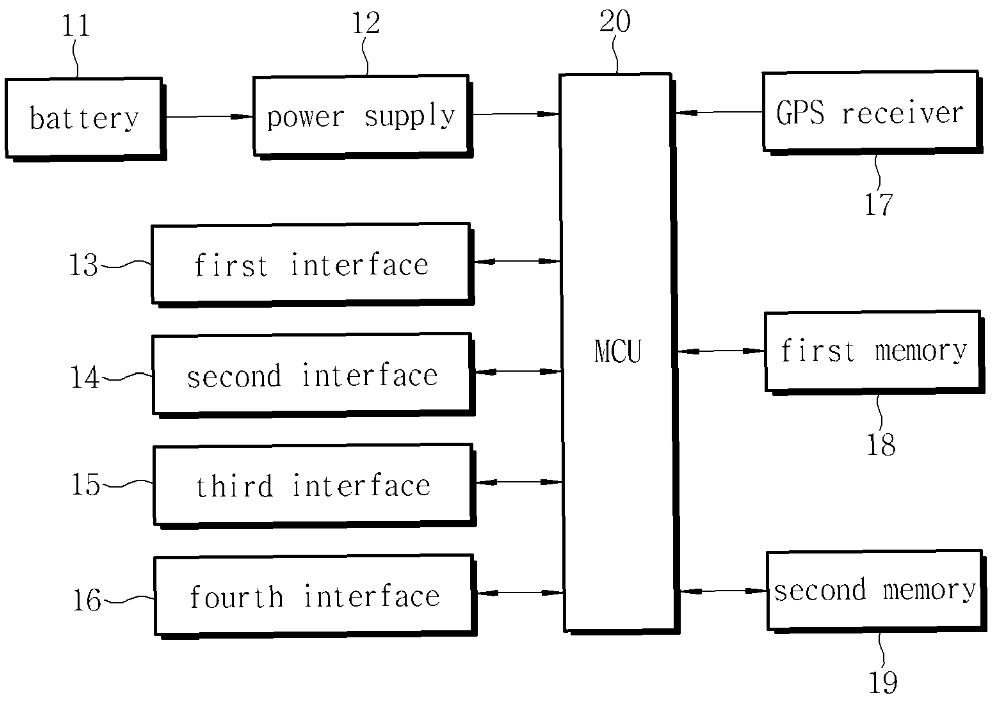
FIG. 1 is a block diagram of a gateway control apparatus for vehicles according to one embodiment of the present disclosure.

Referring to FIG. 1, which is a block diagram of a gateway control apparatus for vehicles or automobiles that travel on roads according to one embodiment of the disclosure, the gateway control apparatus includes first to fourth interfaces 13, 14, 15 and 16 for data communication between ECUs having different communication modes; a first memory 18 storing travel state information received through the first to fourth interfaces 13, 14, 15 and 16; a second memory 19 storing ECU malfunction information; and a micro controller unit (MCU) 20 determining occurrence of an ECU malfunction or a vehicle accident based on the travel state information and allowing the first memory 18 or the second memory 19 to store the malfunction information or the travel state information according to determination results.

The gateway control apparatus further includes a power supply 12 which supplies power from a battery 11 to the MCU 20, and a GPS (Global Positioning System) receiver 17 which receives satellite time from a GPS satellite.

In this embodiment, the first, second, third and fourth interfaces 13, 14, 15 and 16 are a controller area network (CAN), a local interconnect network (LIN), a media oriented systems transport (MOST), and FlexRay, respectively. It should be understood that the disclosure is not limited thereto.

The first memory 18 stores the travel state information sent from various sensors and ECUs in a vehicle, such as a brake control unit, suspension control unit, positioning control unit, tire pressure control unit, steering control unit, and the like. The first memory 18 may preferably have a large storage capacity and store the travel state information received through the first to fourth interfaces 13, 14, 15 and 16 after encoding and compressing the information in a predetermined data compression manner.

The second memory 19 stores the ECU malfunction information. The second memory 19 may have a high access rate. For example, an FRAM is preferably used as the second memory 19 of the apparatus. The second memory 19 may also store the ECU malfunction information being encoded and compressed. The ECU malfunction information includes ECU identification information, ECU malfunction occurrence time information, ECU malfunction type information, such as wire disconnection, over-voltage and over-current, sensor malfunction, low-voltage and low-current, and the like, and travel state information before and after occurrence of an ECU malfunction. Based on such ECU malfunction information, the apparatus enables a user to quickly cope with any malfunction of the ECUs by checking any malfunctioned ECU and time and type of the malfunction.

In this embodiment, the ECU malfunction information includes the type of malfunction, but the disclosure is not limited thereto. Alternatively, a controller 23 may discriminate the type of malfunction through diagnosis or analysis of communication signals, and may allow the second memory 19 to store the malfunction type information together with information of a malfunction occurrence time point.

Figure 2:
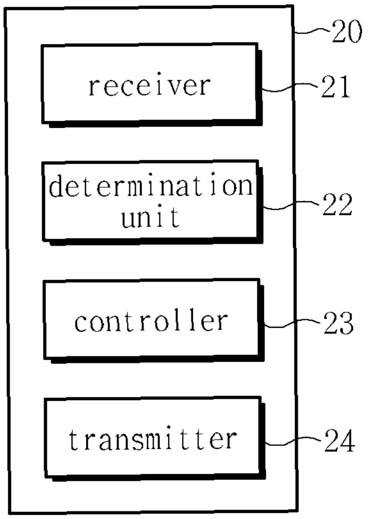
FIG. 2 is a block diagram of an MCU shown in FIG. 1.

The MCU 20 will hereinafter be described with reference to FIG. 2, which is a block diagram of the MCU shown in FIG. 1.

The MCU 20 includes a receiver 21, a determination unit 22, a controller 23, and a transmitter 24.

The receiver 21 receives the travel state information received through the first to fourth interfaces 13, 14, 15 and 16. The controller 23 sends the travel state information, which has been received by the receiver 21, to the first memory 18 to store the travel state information therein. When stored in the first memory 18, each piece of the travel state information is provided with a time stamp. Here, the time stamp may be calculated by a timer (not shown) embedded in the gateway control apparatus or corrected with reference to satellite time received through the GPS receiver 17 after calculation of the timer.

The determination unit 22 determines an ECU malfunction or a vehicle accident based on the travel state information stored in the first memory 18. The travel state information may include vehicle velocity, acceleration, temperature, pressure, manipulation states, vehicle height, air pressure, engine information, steering information, ECU malfunction information, ECU detection information, information of a front or side air-bag operation, information of a vehicle-to-vehicle distance obtained using an ultrasonic wave or RF, and the like. Therefore, for example, when there is an air-bag explosion, emergency button input, abrupt braking, abrupt acceleration, flat tire, or the like, the determination unit 22 determines that the vehicle has been in an accident. If the travel state information includes malfunction information of a certain ECU, the determination unit 22 determines that the ECU has malfunctioned. It should be understood that the disclosure is not limited thereto.

Figure 5:
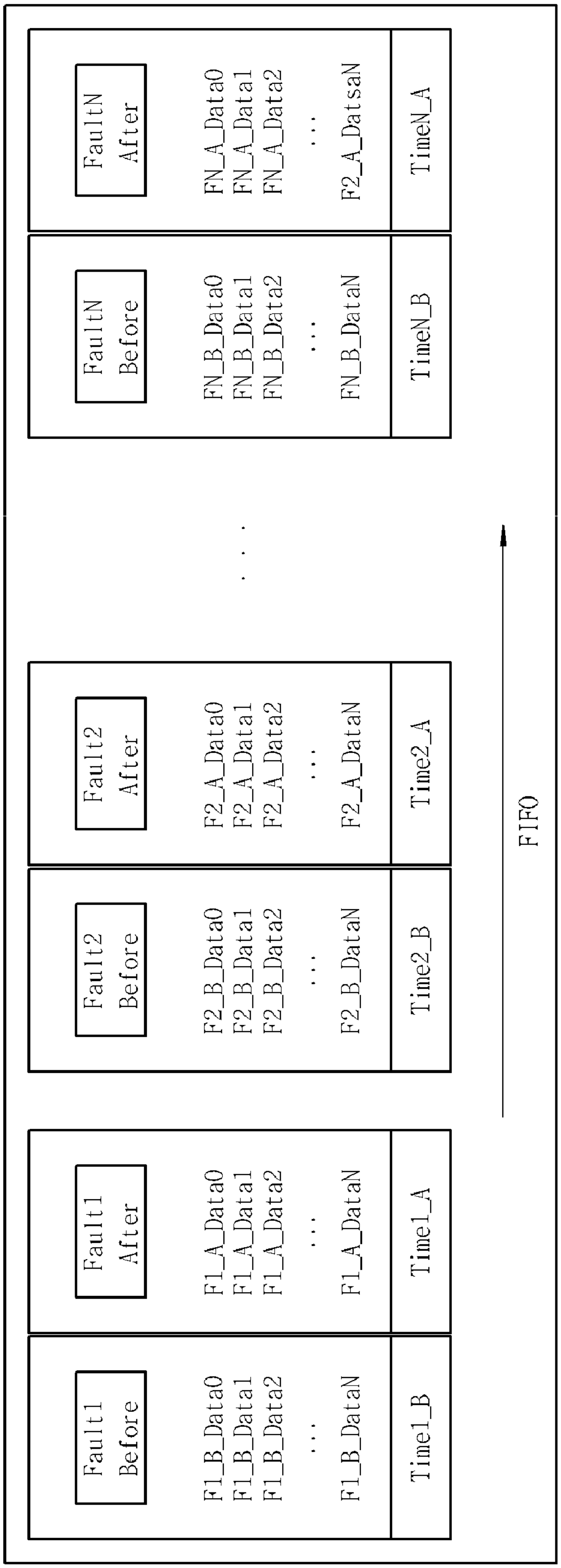
FIG. 5 is an architecture diagram of a second memory of the gateway control apparatus according to the embodiment of the present disclosure.

If the determination unit 22 determines that an ECU malfunction has occurred, the controller 23 reads out information closely relating to the malfunction of an associated ECU among various pieces of travel state information stored in the first memory 18, and allows the second memory 19 to store the information. For example, malfunction information and state information of the associated ECU before and after occurrence of the malfunction are read out by the controller 23 and stored in the second memory 19. Herein, although the second memory 19 is illustrated as storing the malfunction information and state information of the ECU, the second memory 19 may store travel state information before and after occurrence of the ECU malfunction. The travel state information may include information only from the malfunctioning ECU. Alternatively, the travel state information may include information from others or all of the sensors and ECUs. FIG. 5 is an architecture diagram of the second memory 19 which stores and deletes information in a first input first output (FIFO) manner.

If the determination unit 22 determines that a vehicle accident has occurred, the controller 23 allows the first memory 18 to store state information provided for a predetermined duration with reference to an accident occurrence time point, such as state information for several seconds before and after occurrence of the accident. More specifically, the controller 23 allows the first memory 18 to store the state information before and after occurrence of the accident with reference to the accident occurrence time point. Here, post-accident vehicle state information received through the first to fourth interfaces 13, 14, 15 and 16 for a predetermined duration after occurrence of the accident, that is, post-accident vehicle state information, is added to predetermined travel state information stored in the first memory 18 upon occurrence of the accident, that is, pre-accident travel state information, so that the first memory 18 can store the state information before and after occurrence of the accident. When the counted time exceeds a preset time, the controller 23 stops storing the post-accident vehicle state information in the first memory 18. The pre-accident travel state information and the post-accident vehicle state information stored in the first memory 18 may be used for a judgment on the accident causes and procedure in treatment of the accident.

Figure 4:
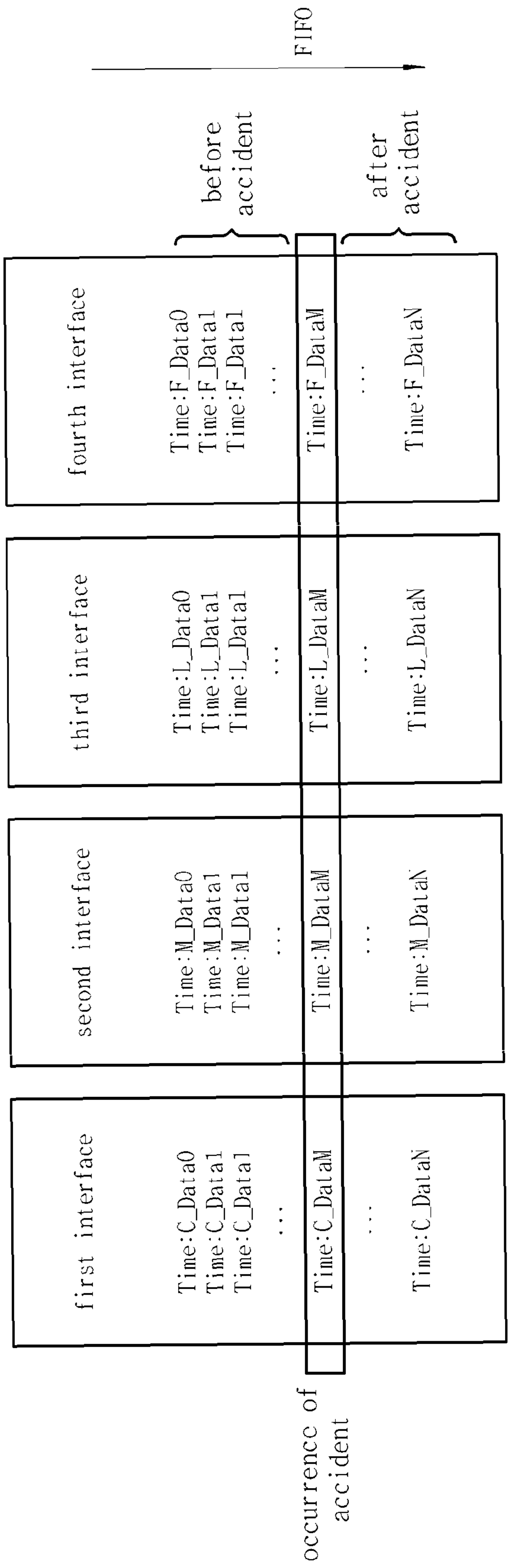
FIG. 4 is an architecture diagram of a first memory of the gateway control apparatus according to the embodiment of the present disclosure.

Referring to FIG. 4, the first memory 18 has an architecture wherein at least one storage space is allocated for each of the first to fourth interfaces 13, 14, 15 and 16. Each of the storage spaces stores and deletes the travel state information, which is received through the first to fourth interfaces 13, 14, 15 and 16 according to time sequence, in a FIFO manner. For example, four storage spaces are allocated in the first memory 18, and consist of a first storage space for storing travel state information received through the CAN in the FIFO manner, a second storage space for storing travel state information received through the MOST in the FIFO manner, a third storage space for storing travel state information received through the LIN in the FIFO manner, and a fourth storage space for storing travel state information received through the FlexRay in the FIFO manner. Further, each of the first to fourth storage spaces deletes the travel state information, which has been firstly stored therein, if there is no more space for recent travel state information.

The transmitter 24 sends the ECU malfunction information stored in the second memory 19 to telematics (not shown) such as wireless terminals, navigation terminals, and the like. Accordingly, a user can quickly cope with malfunction of any ECU.

A method of recording travel information of the gateway control apparatus for vehicles having the configuration as described above will be described with reference to FIG. 3.

Figure 3:
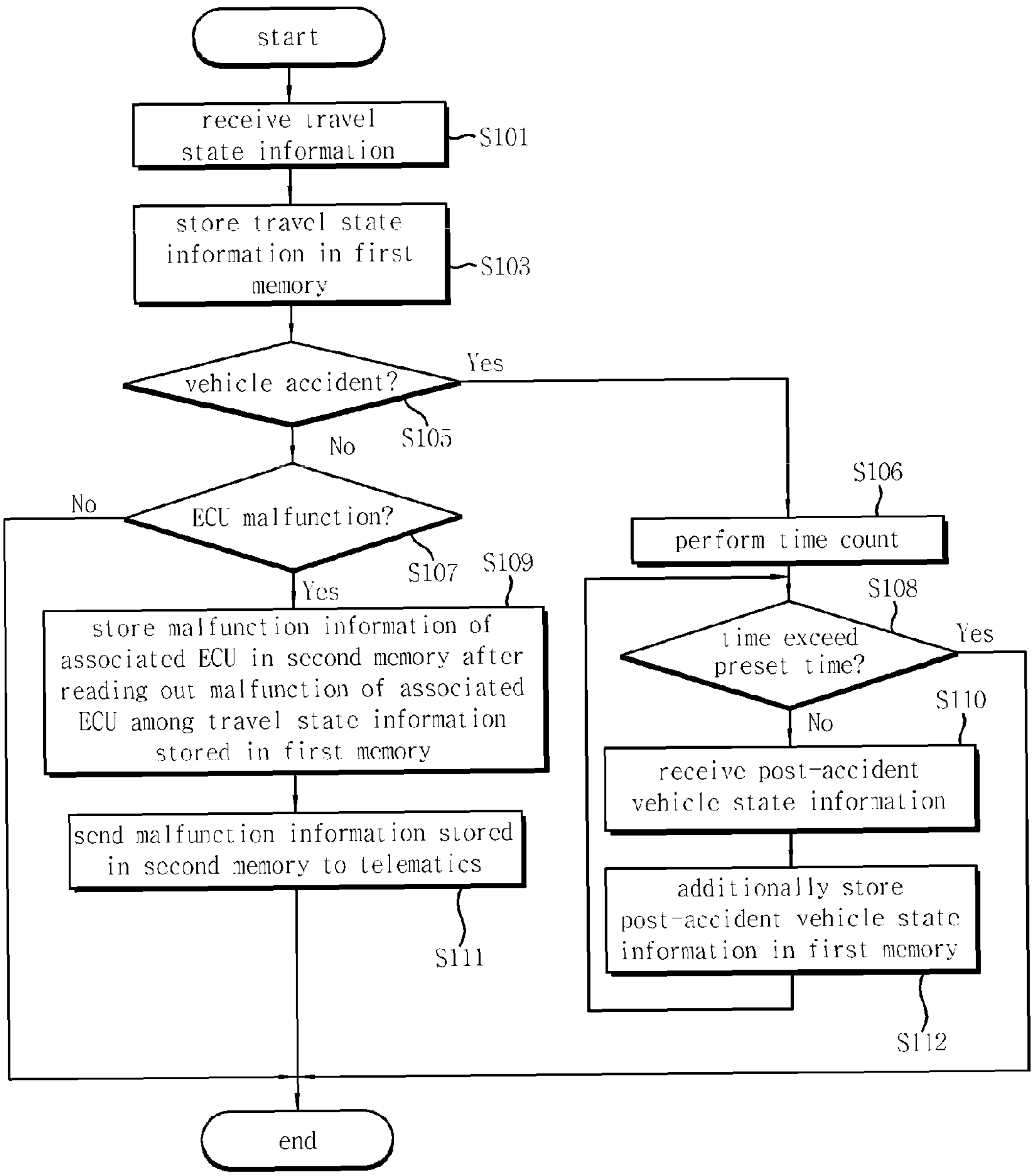
FIG. 3 is a flowchart of a travel information recording method of the gateway control apparatus for vehicles according to one embodiment of the present disclosure.

FIG. 3 is a flowchart of a travel information recording method of the gateway control apparatus for vehicles according to one embodiment of the disclosure.

Referring to FIG. 3, the receiver 21 of the gateway control apparatus receives travel state information through the first to fourth interfaces 13, 14, 15 and 16 in S101.

The controller 23 allows the first memory 18 to store the travel state information received through the first to fourth interfaces 13, 14, 15 and 16 in S103. When stored in the first memory 18, each piece of the travel state information is provided with a time stamp. Herein, the time stamp may be calculated using an embedded timer or corrected with reference to satellite time received by the GPS receiver 17.

Based on the travel state information stored in the first memory 18, the determination unit 22 determines whether a vehicle accident has occurred in S105.

If it is determined in S105 that the vehicle accident has not occurred, the determination unit 22 determines whether an ECU malfunction has occurred in S107.

If it is determined in S107 that there is no ECU malfunction, the controller 23 terminates the process. Although the process is illustrated as being terminated when there is no occurrence of the accident or there is no ECU malfunction in this embodiment, the disclosure is not limited thereto. For example, if the vehicle travels on a road, the process proceeds to the operation of receiving the travel state information in S101.

If it is determined in S107 that the ECU malfunction has occurred, the controller 23 reads out malfunction information of an associated ECU among the travel state information stored in the first memory 18 and allows the second memory 19 to store the malfunction information of the associated ECU in S109.

The transmitter 24 sends the malfunction information of the ECU stored in the second memory 19 to telematics (not shown) in S111. Here, the malfunction information sent to the telematics may include, but is not limited to, alarm information for alarming the malfunction of the ECU and ECU identification information for identifying the ECU. Further, the transmitter 24 may send the malfunction information of the associated ECU to the telematics when there is an event in the second memory 19.

If it is determined in S105 that the vehicle accident has occurred, the controller 23 allows a time count to be performed in S106. Here, the time count may be performed by the embedded timer.

The controller 23 determines whether the counted time exceeds a preset time in S108.

If it is determined in S108 that the counted time exceeds the preset time, the controller 23 terminates the process. Although the process is illustrated as being terminated when the counted time exceeds the preset time in this embodiment, the disclosure is not limited thereto. For example, the process may proceed to the operation of receiving the travel state information in S101 if the vehicle is traveling on road.

If it is determined in S108 that the counted time does not exceed the preset time, the receiver 21 receives post-accident vehicle state information through the first to fourth interfaces 13, 14, 15 and 16 in S110, wherein the post-accident vehicle state information is the same type of information as the pre-accident travel state information, but has a different value from that of the pre-accident travel state information. For example, a traveling speed of 120 km/h is sent as one piece of the pre-accident travel state information, but a traveling speed of 0 km/h is sent as one piece of the post-accident vehicle state information.

Then, the controller 23 allows the first memory 18 to additionally store the post-accident vehicle state information in S112. Afterwards, the process proceeds to the operation of S108. At this time, since the first memory 18 has already stored the pre-accident travel state information, the first memory 18 stores the post-accident vehicle state information by deleting the previously stored pre-accident travel state information to obtain storage space for the post-accident vehicle state information, if the storage space of the first memory 18 is insufficient.

In this method, ECU malfunction information or pre-accident travel state information and post-accident vehicle state information relating to a vehicle accident are stored, so that causes of the ECU malfunction or vehicle accident can be accurately analyzed. As a result, it is possible to prevent recurrence of the same type of vehicle accident or ECU malfunction.

As apparent from the above description, according to one embodiment, the present disclosure ensurely performs communication between vehicle ECUs having different communication modes, further ensurely performs accurate analysis of causes of an ECU malfunction, thereby enabling easy vehicle maintenance and improving reliability of the ECUs while preventing a vehicle accident.

Further, according to one embodiment, travel state information sent from the vehicle ECUs through first to fourth interfaces is stored in a first memory, so that more accurate analysis of causes of a vehicle accident can be obtained based on pre-accident travel state information and post-accident vehicle state information received through the first to fourth interfaces, thereby preventing recurrence of the same type of vehicle accident.

Moreover, according to one embodiment, ECU malfunction information is sent to telematics, so that a user can quickly cope with an ECU malfunction.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gateway control apparatus for an automobile that enables data communication and processing of travel state information from a plurality of electronic control units having different communication modes, the gateway control apparatus comprising:

a receiver configured to receive through interfaces travel state information from a plurality of sensors and each electronic control unit for a brake control unit, a suspension control unit, a positioning control unit, a tire pressure control unit, and a steering control unit, the travel state information of each sensor or electronic control unit including unique identification information for that sensor or electronic control unit that transmitted the travel state information;

a first memory configured to store the received travel state information through the interfaces;

a determination unit configured to determine an occurrence of an automobile accident or an electronic control unit malfunction based on the travel state information stored in the first memory;

a second memory configured to store electronic control unit malfunction information; and a controller configured to store the electronic control unit malfunction information in the second memory if the determination unit determines that the electronic control unit malfunction has occurred, the electronic control unit malfunction information including travel state information from the first memory that corresponds to the electronic control unit that malfunctioned, and if the determination unit determines an automobile accident has occurred, the controller is configured to store pre-accident travel state information and post-accident automobile state information in the first memory that includes an accident occurrence time point, wherein the controller discriminates the type of malfunction through diagnosis or analysis of communication signals, and allows the malfunction information to be stored in the second memory, and the malfunction information of the electronic control unit stored in the second memory is transmitted to wireless terminals for telematics, the malfunction information comprising the discriminated type of malfunction, a malfunction occurrence time point, a identification information of the electronic control unit, and the travel state information before and after occurrence of the electronic control unit malfunction.

2. The gateway control apparatus according to claim 1, wherein the controller is configured to store in the first memory the pre-accident travel state information and the post-accident automobile state information, and is configured to stop storing the post-accident automobile state information when a predetermined period of time elapses after the automobile accident.

3. The gateway control apparatus according to claim 1, wherein the travel state information stored in the first memory includes a time stamp associated with each transmitted travel state information from each sensor or electronic control unit.

4. The gateway control apparatus according to claim 3, wherein the time stamp is calculated by a timer and corrected with reference to satellite time received through a GPS receiver.

5. The gateway control apparatus according to claim 3, wherein if it is determined that the electronic control unit malfunction has occurred, the controller is configured to store in the second memory travel state information of the electronic control unit that malfunctioned before and after occurrence of the electronic control unit malfunction by determining a malfunction occurrence time point based on the time stamp.

6. The gateway control apparatus according to claim 1, wherein the first memory is configured to allocate a designated storage space for each of the plurality of electronic control units to store the received travel state information in the designated storage space according to a time sequence.

7. A travel information recording method of a gateway control apparatus for an automobile, comprising:

storing travel state information received through interfaces from sensors and a plurality of electronic control units for a brake control unit, a suspension control unit, a positioning control unit, a tire pressure control unit, and a steering control unit in a first memory;

determining based on the stored travel state information whether an automobile accident or an electronic control unit malfunction has occurred;

storing electronic control unit malfunction information in a second memory, and the travel state information in the first memory, if it is determined that the electronic control unit malfunction has occurred; and storing pre-accident travel state information and post-accident automobile state information in the first memory with reference to an accident occurrence time point, if it is determined that an automobile accident has occurred, wherein the storing electronic control unit malfunction information in the second memory discriminates the type of malfunction through diagnosis or analysis of communication signals, and allows the malfunction information to be stored in the second memory, and then the malfunction information of the electronic control unit stored in the second memory is transmitted to wireless terminals for telematics, the malfunction information comprising the discriminated type of malfunction, a malfunction occurrence time point, a identification information of the electronic control unit, and the travel state information before and after occurrence of the electronic control unit malfunction.

8. The method according to claim 7, wherein the storing pre-accident travel state information and post-accident automobile state information in the first memory comprises:

performing a time count;

determining whether counted time exceeds a preset time;

receiving and storing the post-accident automobile state information in the first memory, if the counted time does not exceed the preset time; and stopping the storing the post-accident automobile state information in the first memory, if the counted time exceeds the preset time.

* * * * *